April 12, 1960

D. A. GEHLKE ET AL 2,932,731

SPARK INITIATED PULSE GENERATOR

Filed Dec. 3, 1956

DONALD A. GEHLKE
STUART H. BABCOCK
INVENTORS

BY William W. Haefliger

ATTORNEY

United States Patent Office 2,932,731
Patented Apr. 12, 1960

2,932,731
SPARK INITIATED PULSE GENERATOR

Donald A. Gehlke, Sunland, and Stuart K. Babcock, Northridge, Calif., assignors to Babcock Radio Engineering, Inc., Van Nuys, Calif., a corporation of California Application December 3, 1956, Serial No. 625,920

13 Claims. (Cl. 250—17)

This invention relates generally to pulse generators, and more particularly has to do with a novel pulse generator wherein energy initially stored in the field associated with a tuned circuit element may be suddenly released into tthe circuit by means of a spark discharge device in the circuit, the released energy undergoing oscillating interchange between electric and magnetic fields in the circuit and being rapidly withdrawn from the circuit by external coupling thereto and at a rate in the kilowattt range.

The particular pulse generator comprising the invention is to be distinguished in its design and operation from pulse generators such as klystrons and magnetrons employing emitted electron beams that are accelerated or otherwise influenced in their free travel by charged grids or magnetic fields, since no such free electron beam is utilized to obtain pulses of energy from the present device. Also, the spark discharge means utilized in the tuned circuit of the present invention to initiate and sustain resonant oscillation of energy in the circuit is distinguished in its design and use from control devices such as certain gas tubes which act as current rectifiers, instead of conducting current alternately in opposite directions to permit energy oscillation in a circuit.

The invention is primarily concerned with the provision of a pulse generator circuit capable of storing electrical charge and tuned to resonate at a relatively high frequency with low loss, together with spaced electrodes in the circuit that are capable of conducting current flowing in opposite directions across the interelectrode space once the gas in that space has become ionized by an applied triggering voltage, so as to permit the tuned circuit to resonate. Energy is continuously and rapidly withdrawn from the circuit while it is in resonant condition, preferably by inductive coupling with a magnetic field interchanging energy with an electric field, both associated with the tuned circuit.

Generation of pulses of duration as low as 0.1 microsecond are contemplated by the invention, each pulse comprising electromagnetic oscillations of frequency in the megacycle range. Thus, relatively small sized pulse generators can be designed in accordance with the disclosed principles of the invention to produce energy pulses representing power outputs as high as 50 kilowatts or even higher, each pulse consisting of electromagnetic oscillations of frequency as low as 10 megacycles or as high as 10,000 megacycles, illustrating the versatility of these generators as applicable to radio and radar uses.

Other features and objects of the invention, as well as the details of several illustrated embodiments, will be more fully understood from the following detailed description of the drawings, in which.

Figure 1:
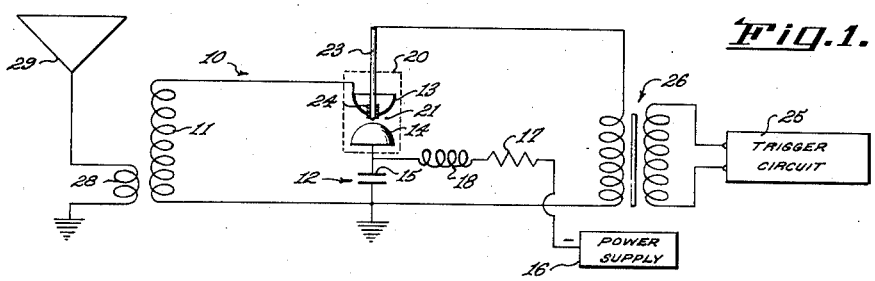
Figure 1 is a circuit diagram illustrating one form of the invention.

The showing in Figure 1 is generally representative of the electrical components of the pulse generator, which components are illustrated in lumped impedance form as they would exist in practice in those instances where the generator is designed to resonate at radio frequencies in the neighborhood of 10 megacycles. The tuned circuit 10 includes an inductance 11 connected in series with a capacitor 12 through a pair of spaced electrodes 13 and 14, the latter being connected in series with the capacitor plate 15.

The capacitor is charged prior to pulse initiation by a suitable power supply 16 connected in series with a suitable charging impedance, illustrated by resistor 17, and a radio frequency choke 18, these elements being connected in parallel with the plate 15 and electrode 14. The capacitor may be typically charged to a potential of around 5000 volts which is correspondingly applied across the electrodes 13 and 14, plate 15 and electrode 14 preferably receiving a negative charge.

The electrodes are enclosed in a suitable housing indicated generally by broken line 20 and containing an ionizable gas such as water vapor, air or argon in the interelectrode space 21. In order that the electrodes may conduct electrical current flowing alternately in opposite directions across the gap or space 21 when the gas is ionized, they are similarly shaped to have smoothly curved exterior surfaces, preferably convex, facing each other across the space 21. As shown in the drawings, these electrodes are hemispherical in shape, and the spacing between them is adjusted so that the charging potential applied across them due to the charge on the capacitor 12 is insufficient to overcome the impedance of the gap, as determined by the ionizing potential of the gas in the particular interelectrode space.

An auxiliary electrode 23 in the form of an elongated narrow probe extends axially through an opening formed in the electrode 13, with the tapered end of the probe projecting into the narrowest portion of the gap 21 toward the opposite electrode 14. A tubular insulator 24 surrounds the probe to separate it from electrode 13, the insulator typically comprising molded tetrafluoroethylene. In order to assure initial arcing between the probe end and electrode 14, the clearance between these two elements is made less than the clearance between the probe and any point on the electrode 13 through which the probe extends, the latter clearance being roughly indicated by the thickness of the insulator.

Controlled arcing between the probe 23 and electrode 14 to ionize the gas and thus establish an alternating current path across the gap 21 between electrodes 13 and 14, is brought about by transmission of a trigger voltage pulse to the probe from a suitable trigger circuit indicated at 25. A suitable pulse transformer 26 coupling the trigger circuit 25 with the probe serves to adjust the applied trigger potential to a typically positive value such that when added to the negative voltage at electrode 14 the combined potential difference applied between these circuit elements is greater than the ionization potential of the gas in the space 21. Once such ionization takes place, the capacitor 12 may discharge through the coil 11 since the tuned circuit is completed, and energy interchange between the electric and magnetic fields associated with the capacitor and coil is begun.

Energy is withdrawn from the circuit as a result of inductively coupling a separate winding 28 with coil 11, the winding 28 being connected with a load, as represented by the antenna 29. The total energy in the tuned circuit, which originally was in the form of electrical charge stored in the capacitor, as given by the expression: ½ C E², where C=capacitance and E=capacitor charging voltage, is rapidly reduced as represented by the area between the upper envelope 30 and the time abscissa in Figure 3, the energy decay being exponential. The oscillating and decreasing peak voltages in the tuned circuit accompanying energy decay are shown at 31 in Figure 3, the voltage swinging between positive and negative values, and the oscillations filling the area under the upper envelope. After a time elapse represented by the parameter "Q" voltage cycles or oscillations, the total energy in the tuned circuit has dropped to 37% of the initial energy, while after two "Q" cycles, only 15% of the energy remains, the quality factor "Q" being defined as the ratio of stored energy to energy lost per cycle of oscillation. Thus, energy in the tuned circuit is effectively "wrung out" by the coupling winding in the form of an energy pulse.

Figure 2:
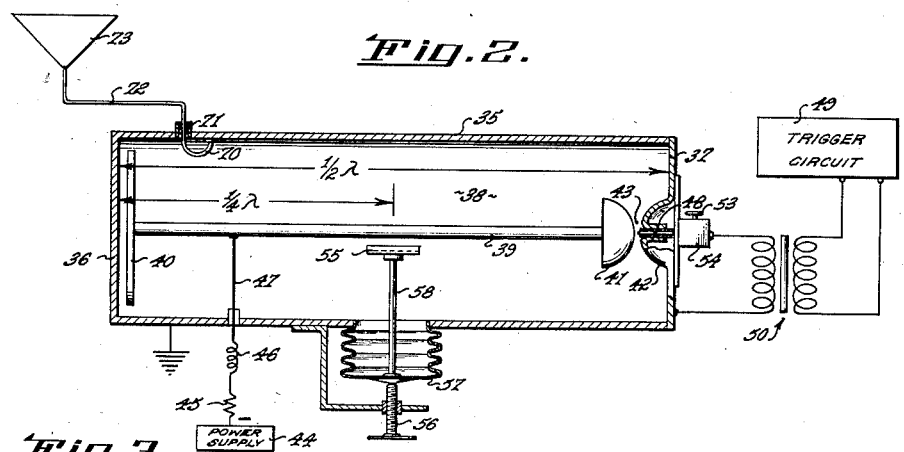
Figure 2 is an elevation taken in section through another form of the invention.

The device shown in Figure 2 represents a typical application of the invention to circuits adapted to resonate at ultra high frequency and higher frequencies up to X band, i.e. around 10,000 megacycles. A thin walled conductive metallic tubular body 35 is shown with its closed opposite ends 36 and 37 enclosing a cylindrical cavity 38 having a length equal to substantially one-half the wave length of the electromagnetic oscillations produced during resonance of the circuit that includes the body 35. Extending axially in the cavity is a conductor rod 39 remaining electrically disconnected from body 39, but having an ability to store electrical charge along its length in accordance with its effective distributed capacitive coupling with grounded body 35. One end of the rod mounts a capacitor plate 40 in closely spaced relation with the closed end 36 of the body 35 to lend additional capacitive coupling therewith, while the opposite end of the rod mounts a hemispherical electrode 41 similar to electrode 14 shown in Figure 1. The other closed end 37 of the body is axially re-entrant into cavity 38 to form a similar sized and shaped electrode 42 opposite electrode 41, and a suitable ionizable gas is introduced into the cavity 38 so as to fill the interelectrode space 43.

Figure 4:
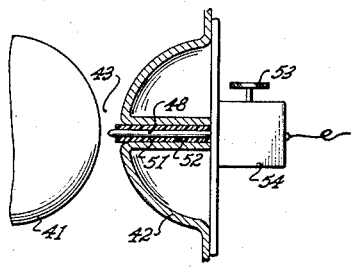
Figure 4 is an enlarged fragmentary view of the electrode system for controlling pulsing of the circuit.

Negative electrical charge is stored on rod 39 and plate 40 by a direct current source indicated at 44 and electrically connected with rod 39 through a charging impedance 45 and a radio frequency choke 46, both being outside the cavity 38, a lead 47 extending through the side wall of the body 35 connecting the choke with the rod. While the charging potential applied to the rod, plate and electrode 41 with respect to body 35 capacitively coupled with these elements is insufficient to overcome the ionizing potential of the gas in the interelectrode space, an additive trigger voltage pulse applied to the auxiliary electrode 48 by a trigger circuit 49 and through a suitable pulse transformer 50 is sufficient to ionize the gas permitting high frequency alternating current flow across the gap 43. Electrode 48 is better shown in Figure 4 to comprise an elongated rod received in an insulating sleeve 51 axially centered in an opening 52 formed by electrode 42, so that the tapered end of the auxiliary electrode is closer to electrode 41 than to electrode 42. The clearance between electrodes 48 and 41 may be conveniently adjusted for optimum generator performance by turning the thumb screw 53 to advance or retract the electrode 48, as through suitable fine gearing indicated at 54 as being operatively connected with electrode 48 and thumb screw 53.

Adjustable tuning of the high "Q" cavity resonator shown in Figure 2 may be accomplished by moving an additional small capacitor plate 55 closely spaced to the rod 39 mid-way between the ends of the cavity, i.e. at an approximate quarter wave length distance from either end of the cavity. That additional plate is grounded to the body 35 and actuated by a thumb screw 56 moving a spring bellows 57 toward and away from the rod 39, the bellows being mounted by the housing 35 and in turn mounting a link 58 connected with the plate 55.

Once the gas in the interelectrode space 43 has become ionized, current flows back and forth across the gap between electrodes 41 and 42 at the resonant frequency of the circuit determined by the distributed capacitance and inductance associated with all the elements through which current flows, the values of these impedances being such that the resonant frequency is in the ultra high frequency range or higher, i.e. up to X band frequencies and higher, as limited only by the design of the cavity resonator.

Typical values of potential initially applied across electrodes 41 and 42 and subsequently applied to auxiliary electrode 48 for pulsing the circuit are —5000 volts and +8000 volts, respectively. The diameter of the cavity and rod may vary within rather wide limits, whereas the length of the cavity is dictated by the desired half wave length of electromagnetic oscillations of the frequency at which the pulse generator is designed to resonate. As an indication of the low order of capacitance involved, the overall capacitance between the housing 35 and the elements 39, 40 and 41 may be around $10^{-9}$ farads.

Figure 5:
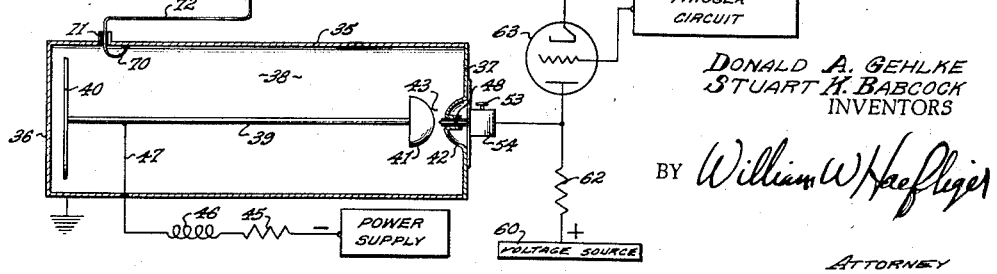
Figure 5 is an elevation taken in section through a slightly modified form of the invention.

While a positive voltage pulse supplied by external circuit 49 initiates conduction across gap 43 in the Figure 2 embodiment, it is contemplated that a negative voltage pulse may accomplish the same function. As illustrated in Figure 5 wherein the elements of the generator shown are given the same numbers as in Figure 2, the external trigger circuit connected with auxiliary electrode 48 comprises a source of positive voltage indicated at 60 sufficiently high that when fully applied to the electrode 48 the gas in space 43 becomes ionized. A lower voltage insufficient to produce such ionization is ordinarily applied to that electrode in view of the voltage drop across the load resistor 62 connected between the plate of the conducting triode 63 and the D.C. source. However, when the tube is suddenly biased to cut-off by a negative voltage pulse supplied to the tube grid by trigger circuit 64, the full voltage of the source 60 is applied to electrode 48, initiating gas ionization.

Figure 3:
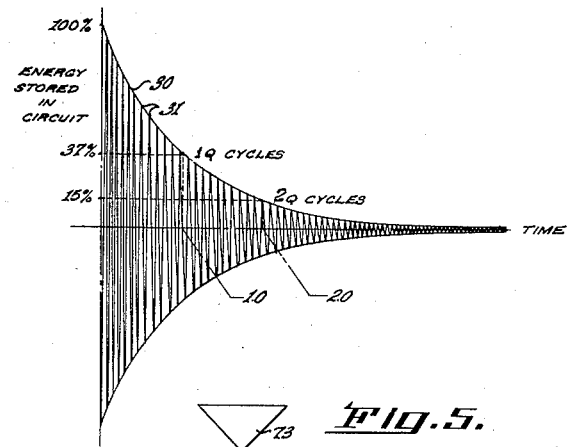
Figure 3 is a curve illustrating the rate of stored energy withdrawal from the circuit during pulse generation.

Energy is rapidly withdrawn from the novel cavity resonator form of pulse generator by coupling loop 70 extending into the cavity side through insulator 71, a suitable coaxial cable or other means indicated at 72 being used to conduct the withdrawn radio frequency energy to a load indicated by radar antenna 73. The loop is oriented so that during circuit resonance it is inductively coupled with the oscillating magnetic field in the cavity, with the result that about 63% of the initially stored energy in the tuned circuit is withdrawn after "Q" cycles or oscillations in the circuit, as indicated in Figure 3.

As an illustration of the amount of power being withdrawn from the circuit, assuming that the circuit capacitance is $10^{-9}$ farads, the charging voltage is 5000 volts, and that most of the stored energy is withdrawn in 1 micro-second, then approximately 0.125 watts have been withdrawn in that time interval, which is a rate of energy withdrawal equivalent to 62.5 kilowatts.

We claim:

1. The combination, comprising a pulse generator circuit including a chamber forming an enclosed cavity and tuned to resonate at a frequency not less than ultra high frequency with energy interchange between magnetic and electric fields in the cavity, a pair of spaced electrodes in the cavity and an ionizable gas in the interelectrode space, said electrodes being adapted to conduct current flowing in said circuit alternately in opposite directions across said space when said gas is ionized, said circuit including capacitance and said electrodes and capacitance being within the enclosed cavity and in open communication therein, means in the cavity electrically interconnecting said capacitance with one electrode, means through which current is flowable for charging said capacitance to a potential applied across said electrodes insufficient to effect gas ionization, said last named means extending through the chamber wall, means for effecting sudden ionization of said gas permitting discharge of said capacitance in said circuit thereby causing it to resonate, and means coupled with said circuit for withdrawing electrical energy therefrom during said resonant condition thereof.

2. The invention as defined in claim 1 in which said means through which charging current is flowable to the capacitance includes a radiofrequency choke electrically connected with said capacitor and one of said electrodes.

3. A pulse generator, comprising circuit means including a grounded chamber forming an enclosed cavity, said means being tuned to resonate at a frequency not less than ultra high frequency with energy interchange between magnetic and electrical fields in the cavity, spaced electrode means in the cavity and an ionizable gas in the interelectrode space, said electrodes being adapted to conduct current flowing in said circuit alternately in opposite directions across said space when said gas is ionized, said circuit means including capacitance chargeable to produce a potential applied across said electrodes insufficient to effect gas ionization, said capacitance and electrode means being within the enclosed cavity and in open communication therein, said capacitance including a capacitor plate, means in the cavity electrically interconnecting said plate with one electrode, means extending through the chamber wall and into said cavity for supplying electrical charge to said capacitor plate and said electrode means, and means extending within the cavity for effecting sudden ionization of said gas permitting discharge of said capacitance in said circuit thereby causing it to resonate.

4. A pulse generator, comprising circuit means including a grounded chamber forming an enclosed cavity, said means being tuned to resonate at a frequency not less than ultra high frequency with energy interchange between magnetic and electric fields in the cavity, first and second spaced electrodes in the cavity and an ionizable gas in the interelectrode space, said electrodes being adapted to conduct current flowing in said circuit alternately in opposite directions across said space when said gas is ionized, said circuit means including capacitance connected with the first of said electrodes and being chargeable to a potential applied across said electrodes insufficient to effect gas ionization, said capacitance and said electrodes being within the enclosed cavity and in open communication therein, said capacitance including a capacitor plate, means in the cavity electrically interconnecting said plate with one electrode, trigger means including a third electrode extending proximate said first electrode within the cavity for effecting sudden ionization of said gas permitting discharge of said capacitance in said circuit thereby causing it to resonate, means extending through the chamber wall and into said cavity for supplying electrical charge to said capacitor plate and one of said first and second electrodes, and means coupled with said circuit means for withdrawing energy from said magnetic field during said circuit resonant condition.

5. The invention as defined in claim 4 in which said chamber comprises a tubular metallic body forming a cylindrical cavity.

6. The invention as defined in claim 5 in which the opposite ends of said chamber are closed and the cavity length is substantially one-half the length of electromagnetic waves produced during said circuit resonant condition.

7. The invention as defined in claim 6 in which said circuit means includes an elongated rod extending axially within said cavity and connecting said capacitor plate with one of said first and second electrodes.

8. The invention as defined in claim 7 in which said first and second electrodes have convexly curved surfaces facing each other across said space within one end portion of said cavity.

9. The invention as defined in claim 8 in which said second electrode is integral with one end of said chamber and contains an opening through which said third electrode projects into said cavity toward said first electrode in spaced relation to said second electrode.

10. The invention as defined in claim 9 including an insulator extending between said third and second electrodes within said opening.

11. The invention as defined in claim 8 in which said capacitor plate is capacitively coupled with the opposite closed end of said chamber.

12. The invention as defined in claim 11 in which said energy withdrawing means comprises a metallic loop extending into said cavity.

13. The invention as defined in claim 11 including another capacitor plate adjustably capacitively coupled with said rod in the cavity and connected in series with said tubular chamber for adjusting the resonance frequency of said circuit.

References Cited in the file of this patent

UNITED STATES PATENTS

| | | |
|---|---|---|
| 1,908,249 | Hund | May 9, 1933 |
| 2,103,090 | Plebanski | Dec. 21, 1937 |
| 2,251,877 | Hagedorn | Aug. 5, 1941 |
| 2,287,542 | Vang | June 23, 1942 |
| 2,351,439 | Livingston | June 13, 1944 |
| 2,400,456 | Haine et al. | May 14, 1946 |
| 2,405,217 | Labin | Aug. 6, 1946 |
| 2,422,176 | Benioff | June 17, 1947 |
| 2,433,758 | Hershberger | Dec. 30, 1947 |
| 2,508,954 | Latour et al. | May 23, 1950 |
| 2,617,925 | Young | Nov. 11, 1952 |
| 2,629,051 | Lindenblad | Feb. 17, 1953 |
| 2,706,786 | White | Apr. 19, 1955 |